US009355287B2

(12) United States Patent
Herrick et al.

(10) Patent No.: US 9,355,287 B2
(45) Date of Patent: May 31, 2016

(54) METHOD AND SYSTEM FOR IMPROVING READING RANGE OF FDX RFID TAGS

(71) Applicant: Herrick Technology Laboratories, Inc., Manchester, NH (US)

(72) Inventors: David L. Herrick, Mont Vernon, NH (US); Edmund L. Chase, Windham, NH (US)

(73) Assignee: Herrick Technology Laboratories, Inc., Manchester, NH (US)

( * ) Notice: Subject to any disclaimer, the term of this patent is extended or adjusted under 35 U.S.C. 154(b) by 0 days.

(21) Appl. No.: 14/709,558

(22) Filed: May 12, 2015

(65) Prior Publication Data

US 2015/0332072 A1    Nov. 19, 2015

Related U.S. Application Data

(60) Provisional application No. 61/992,548, filed on May 13, 2014.

(51) Int. Cl.
*G06K 7/10* (2006.01)
*H04Q 5/22* (2006.01)

(52) U.S. Cl.
CPC ........ *G06K 7/10198* (2013.01); *G06K 7/10128* (2013.01); *H04Q 5/22* (2013.01)

(58) Field of Classification Search
CPC ............ G06K 7/0008; G06K 19/0723; G06K 7/10297; G06K 7/10009; G06K 7/10356; G06K 7/10198; G06K 19/07749
USPC ........................................................ 340/10.3
See application file for complete search history.

(56) References Cited

U.S. PATENT DOCUMENTS

| | | | | |
|---|---|---|---|---|
| 8,446,254 B2* | 5/2013 | Carrick | ...................... | G01S 5/14 340/10.1 |
| 8,937,531 B2* | 1/2015 | Rimai | ................ | G06K 7/10069 235/375 |
| 8,948,279 B2* | 2/2015 | Volpi | ................... | G06K 7/0008 340/10.1 |
| 2006/0077036 A1* | 4/2006 | Roemerman | .......... | G06Q 10/08 340/5.61 |
| 2008/0018432 A1* | 1/2008 | Volpi | ...................... | G01S 13/66 340/10.3 |
| 2009/0156153 A1 | 6/2009 | Al-Mahadawi | | |
| 2010/0120368 A1 | 5/2010 | Smith | | |
| 2011/0090062 A1 | 4/2011 | Hofer et al. | | |
| 2012/0019399 A1 | 1/2012 | Vargo et al. | | |
| 2013/0241708 A1 | 9/2013 | Tuttle | | |

OTHER PUBLICATIONS

International Search Report Corresponding to PCT/US2015/030256 Mailed Aug. 10, 2015.
Written Opinion Corresponding to PCT/US2015/030256 Mailed Aug. 10, 2015.

* cited by examiner

*Primary Examiner* — Mark Blouin
(74) *Attorney, Agent, or Firm* — Davis & Bujold PLLC; Michael J. Bujold

(57) ABSTRACT

A system and method comprising an RFID scanner, a reader or an interrogator for interrogating a transponder of a desired RFID tag to be interrogated; a transmission device for transmitting a desired carrier signal toward the RFID tag to be interrogated; a receiving device for receiving an RFID signal from the RFID tag to be interrogated; a processing device for removing the carrier signal from the RFID signal and thereby leaving an encoded data field of the RFID tag to be interrogated and processing the encoded data field for determining a start bit sequence of the encoded data field for at least one scan; and an averaging device for averaging the encoded data fields of at least two scans with one another and facilitate reading the encoded data field of the RFID tag to be interrogated.

13 Claims, 9 Drawing Sheets

Signal Processing Block Diagram

Strong Data Bits Easily Decoded Without Frame-to-Frame Integration

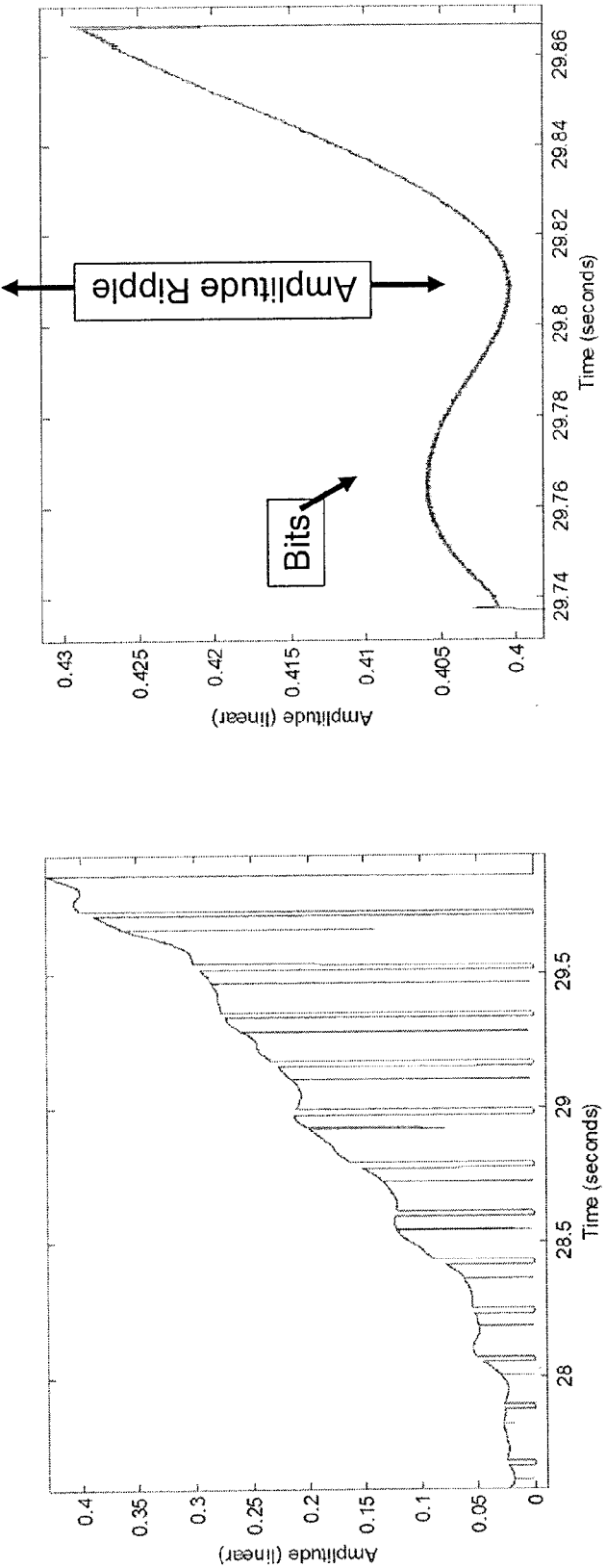

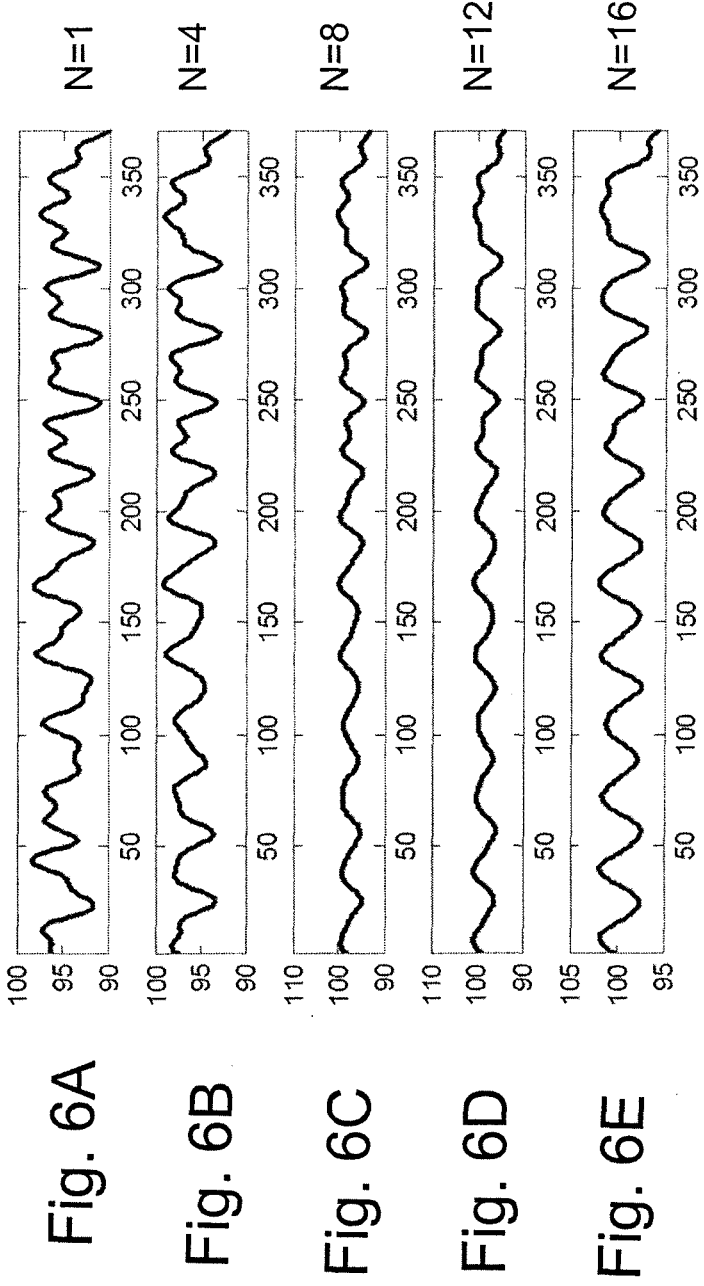

METHOD AND SYSTEM FOR IMPROVING READING RANGE OF FDX RFID TAGS

This application claims the benefit of U.S. provisional application Ser. No. 61/992,548 filed May 13, 2014.

BACKGROUND OF THE INVENTION

1. Field of the Invention

The present invention relates to an improved system and method for increasing the read range, by a RFID scanner, a reader or an interrogator, of conventional FTX RFID tags.

2. Description of Related Prior Art

As is well known in the art, a RFID tag is a microchip which typically includes an antenna that is packaged in a such way that RFID tag can be applied to a variety of desired objects, animals or possibly human beings. An RFID tag, when receives and picks up an interrogation signal from an associated RFID scanner, reader or interrogator, transmits or sends a return signal(s) back to the RFID scanner, reader or interrogator. The RFID tag contains a data field identification information or encoded data field, e.g., a unique serial number, a unique customer account number, some other unique identifying indicia, etc., which is stored in an area of memory. It is to be appreciated that RFID tags come in many forms, but are typically relatively small and may be either active, passive or semi-passive.

As is well known in the art, RFID tags are commonly injected into pets or other animal animals in order to facilitate positive identification and cross indexing to medical records and other databases. It is possible that such RFID tags may also be incorporated or included as part of a component(s) transplanted into a human being, such as an artificial knee, an artificial hip, etc., and thereby subsequently utilized to identify the serial number, the model number, the date of installation, the manufacturer of the component, etc. Such product information is useful in the event that a defect, in the transplanted component, is eventually discovered and there becomes a need to recall such transplanted component(s).

As is well known in the art, RFID tags are typically interrogated by locating a handheld RFID scanner, reader or interrogator in close proximity to the location where the RFID tag resides, e.g., the area of the animal's skin accommodating the embedded RFID tag for example. The associated RFID scanner, reader or interrogator typically transmits and receives radio waves and is then combined with a digital signal processor that converts the waves into bits of information which can then be deciphered, by internal circuitry of the RFID associated scanner, reader or interrogator, in a conventional manner.

One problem with known prior art scanners and techniques is that they generally require the scanner to be located in very close proximity to the RFID tag, e.g., no more that a few inches or so, in order for the RFID scanner, reader or interrogator to read accurately the information stored on the RFID tag. In addition, many prior art RFID scanners, readers or interrogators typically "interrogate" the RFID tag for only a short duration of time, then turn off for a very short duration of time, and then continuously repeat this interrogation cycle of turning on/off until the data or information, stored in the data field on the RFID tag, is accurately read by the RFID scanner, reader or interrogator. It is to be appreciated that since the RFID scanner, reader or interrogator must be located very close to the RFID tag, it is sometimes quite difficult and time consuming to locate the RFID tag so as to facilitate accurate reading thereof.

The inventor has determined that there are two major factors which limit the useful range of the RFID scanner, reader or interrogator. These factors area (1) the RFID scanner, reader or interrogator has difficulty delivering enough signal, at 134.2 kHz, in order to adequately power the transponder, (2) the RFID scanner, reader or interrogator does not have a sufficient dynamic range in order to detect responses that may be 80 dB or more weaker than the 134.2 kHz carrier signal generated by the RFID scanner, reader or interrogator.

SUMMARY OF THE INVENTION

Wherefore, it is an object of the present invention to overcome the above mentioned shortcomings and drawbacks associated with the prior art RFID scanners, readers and interrogators and associated reading techniques for RFID tags.

Another object of the present invention is to provide a system and method which is suitable for activating an RFID tag so that the internal capacitor or transponder, contained within the RFID tag, can be sufficiently excited and energized by the carrier (interrogation) signal of the RFID scanner, reader or interrogator and, thereafter, automatically transmit the encoded data field to the RFID scanner, reader or interrogator so that the encoded data field can be readily read and decipher within a relatively short duration of time.

Another object of the present invention is to increase the read range of the RFID tags, by an RFID scanner, reader or interrogator, such that the read range is at least 6 inches and, more preferably, the read range of an RFID tag approaches 15 to 24 inches or more thereby making it more easy to locate the RFID scanner, reader or interrogator and is close proximity to an RFID tag so as to facilitate accurate reading of the same.

A further object of the present invention is to interrogate the RFID tag in a substantially continuous manner so as to facilitate a more rapid scanning, reading and/or interrogation of the encoded data field which is stored on the RFID tag to be interrogated.

Yet another object of the present invention is to receive the encoded data filed, transmitted by the internal circuitry of the RFID tag, and then to substantially remove or eliminate, from the received encoded data field, the initially transmitted carrier signal thereby primarily leaving only the transmitted encoded data field from the RFID tag, plus possibly some extraneous noise, which can be more easily and accurately processed and deciphered by the system and the method according to the present invention.

A still further object of the present invention is for the RFID scanner, reader or interrogator to deliver enough signal, typically a frequency ranging between 9 kHz and 3000 GHz for example, in order to adequately power or energize the transponder into commencing its transmission of the stored encoded data field.

Yet another object of the present invention is to provide the RFID scanner, reader or interrogator with a sufficient dynamic range so as to detect responses that may be 80 dB or more weaker than the 134.2 kHz carrier signal generated by the RFID scanner, reader or interrogator.

A further object of the invention is to provide the RFID scanner, reader or interrogator with an RFID tag detection proximity indicator, e.g., a "warmer-colder" proximity indicator, which evaluates the amplitude of the baud rate line, which forms the basis for the signal strength measurement, so that when the RFID scanner, reader or interrogator is moving in a direction toward the RFID tag to be interrogated, the amplitude of the baud rate line increases, while when the RFID scanner, reader or interrogator is moving in a direction away from the RFID tag to be interrogated, the amplitude of the baud rate line decreases. The RFID tag detection proximity indicator will emit a signal which is directly related to the amplitude of the baud rate line thereby providing an indicator to the operator, e.g., getting "warmer" or closer to the RFID tag to be interrogated, or getting "colder" or further away from the RFID tag to be interrogated. It is to be appreciated that the RFID tag detection proximity indicator may either be an audio indicator, a visual indicator, a vibration type indicator or any other conventional proximity indicator which may be readily perceived by the operator and assist the operator of the RFID scanner, reader or interrogator with quickly locating and reading the RFID tag to be interrogated. This is possible because the presence of a baud rate spectral line with data bits transitioning synchronously with the scanner signal can be detected well or long before a correct CRC is eventually obtained during the reading process.

Still another object of the present invention is to utilize the RFID scanner, reader or interrogator as an authorization identifier for actuating a door unlocking mechanism of an RFID based smart pet door. More specifically, the RFID scanner, reader or interrogator can be utilized to detect any RFD tag, carried by or contained within an authorized pet or animal attempting to gain access through the smart pet door and only unlock the door unlocking mechanism of the RFID based smart pet door upon determining that the pet or other animal attempting to gain entrance through the pet door was previously authorized.

A further object of the present invention is to supply the transmission coil with increased voltage and current so as to transmit a stronger carrier signal to the RFID tag so as to facilitate exciting the RFID tag from a greater distance and thereby increase the read range of the RFID scanner, reader or interrogator.

Yet another object of the invention is to separate and spaced the transmission coil from the receiving coil so increase the distance between those two coils thereby reduce the effects that the transmitted carrier signal has on the receiver coil and improve the sensitivity of the RFID signal.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which:

FIG. 4A is an exemplary graph of collected data bits collected according to the prior art which a transient, at longer range, can be stronger than the bit stream;

FIG. 4B is an exemplary graph of collected data bits collected according to the present invention in which a transient is minimal;

FIG. 6A is an exemplary graph of the results of a single sample of the collected and processed bits;

FIG. 6B is an exemplary graph of the results of four samples of the collected and processed bits following subsequently averaging thereof with one another;

FIG. 6C is an exemplary graph of the results of eight samples of the collected and processed bits following subsequently averaging thereof with one another;

FIG. 6D is an exemplary graph of the results of twelve samples of the collected and bits following subsequently averaging thereof with one another;

FIG. 6E is an exemplary graph of the results of sixteen samples of the collected and processed bits following subsequently averaging thereof with one another;

DETAIL DESCRIPTION OF THE PREFERRED EMBODIMENTS

Figure 1:
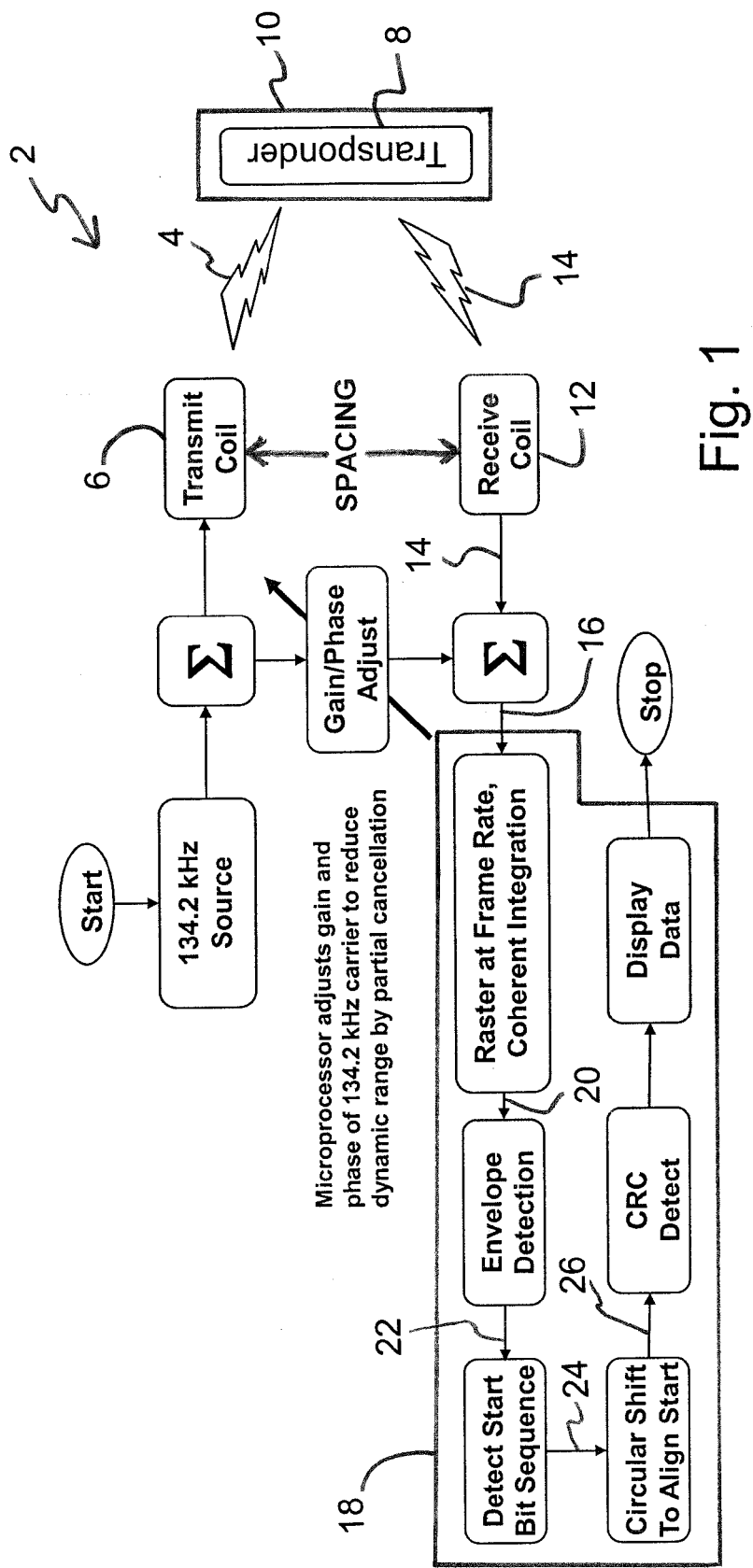
FIG. 1 is a diagrammatic view of the signal processing block diagram according to the present invention.

As is conventional in the art, the RFID tag contains an encoded data field, e.g., unique serial number typically comprising 128 characters of relevant information (response message) and each character of the data field comprises a sequence of ones ("1") and/or zeroes ("0") of a binary code. As is conventional in the art, the data field of a RFID tag typically comprises a start bit sequence (e.g., typically 11 bits, for example, 00000000001), 38 ID bits, 10 country code bits (generally according to ISO 3166), 1 extra application bit, 14 reserved bits, 1 animal bit, 16 CCITT CRC over the previous bits, and 24 application bits. It is to be appreciated that after the initial 11 bits, which comprise the start bit sequence, a framing bit ('1') is typically sent after every 8 data bits.

During interrogation of the RFID tag, once the RFID tag is sufficiently energized by a RFID scanner, reader or interrogator, the internal circuitry or transponder of the RFID tag will then commence transmission of the entire encoded data field in predefined sequential transmission order, beginning with the start bit sequence which is then followed by a remainder of the encoded data field. After completing transmission of the entire encoded data field, the RFID tag will generally become dormant or inactive, unless sufficiently re-energized. That is, if the internal circuitry of the RFID is again adequately re-energized by the RFID scanner, reader or interrogator which typically occurs during a conventional interrogation process—the RFID tag will again commence another transmission of the entire encoded data field to the RFID scanner, reader or interrogator.

This process is typically repeated until a conventional cyclic redundancy check (CRC) feature of the method or the system, according to the present invention, confirms that the entire data field, stored on the RFID tag being interrogated, was accurately read by the RFID scanner, reader or interrogator so that another interrogation of the RFID tag being interrogated, by the RFID scanner, reader or interrogator, is no longer required and can be terminated. As is well known in the art, the CRC is a conventional method of checking the data stored on the RFID tag to ensure that the stored date is not corrupted or that a portion of the stored information is lost.

As is conventional and well known in the art, FDX (Full Duplex) chips transponders respond simultaneously while harvesting power from the RFID scanner, reader or interrogator. In addition, the chips do not literally transmit but instead employ a passive "load modulation" technique. That is, the chip or transponder of the RFID tag and the RFID scanner, reader or interrogator operate very similar to a loosely coupled transformer. As a result of this, changes in the load presented by the chip or the transponder of the RFID tag (secondary winding) affect the impedance seen by the RFID scanner, reader or interrogator (primary winding). A resistor is switched in and out of the circuit at a rate equal to the scanner's frequency (134.2 kHz) divided by 32, e.g., the carrier signal generally has a frequency which ranges between 9 kHz and 3000 GHz. This results in an amplitude modulated signal which has an extremely low modulation percentage.

Turning now to FIG. 1, a detailed description concerning the present invention will now be provided. As generally shown in this Figure, the RFID scanner, reader or interrogator 2 generates and transmits a carrier (interrogation) signal 4 from a transmission device or coil 6 toward the internal circuitry 8, e.g., the transponder, of a desired RFID tag 10 to be interrogated. The carrier signal 4 is of a sufficient magnitude so as to excite and energize the transponder 8 of the RFID tag 10 into thereafter initiate transmission, or passive load modulation, of the encoded data field, e.g., 128 characters or bits of the response message stored in the memory of the RFID tag 10. Provided that the internal circuitry 8, e.g., the transponder, is adequately energized, the transponder commences transmission of the stored data field information, from the RFID tag 10, and such transmission is received by a receiver device or coil 12 of the system and the method for subsequent processing so that the encoded data field, stored in the RFID tag 10, can then be accurately deciphered and read. It is desirable that the voltage and current, supplied to the transmission coil 6 are of a sufficient intensity so as to facilitate energizing the RFID tag 10 from an increased distance, e.g., a distances of at least 15 to 24 inches or so.

Preferably, the transmission coil 6 is sufficiently spaced or separated from the receiver coil 12 so that the RFID tag 10 to be interrogated can be generally located between the two coils 6, 12. That is, the RFID tag 10 to be interrogated is located closer each of the two coils 6, 12 then the spacing of the two coils 6, 12 from one another. a result of such arrangement, the carrier signal has a longer distance to travel from the transmission coil 6 to the RFID tag 10 being interrogated and finally to the receiver coil 12 where the transmitted carrier signal is generally weaker. ch arrangement minimizes the effect that the transmitted carrier signal has on receiver coil 12 and thereby improves upon the sensitivity of the system.

Figure 2:
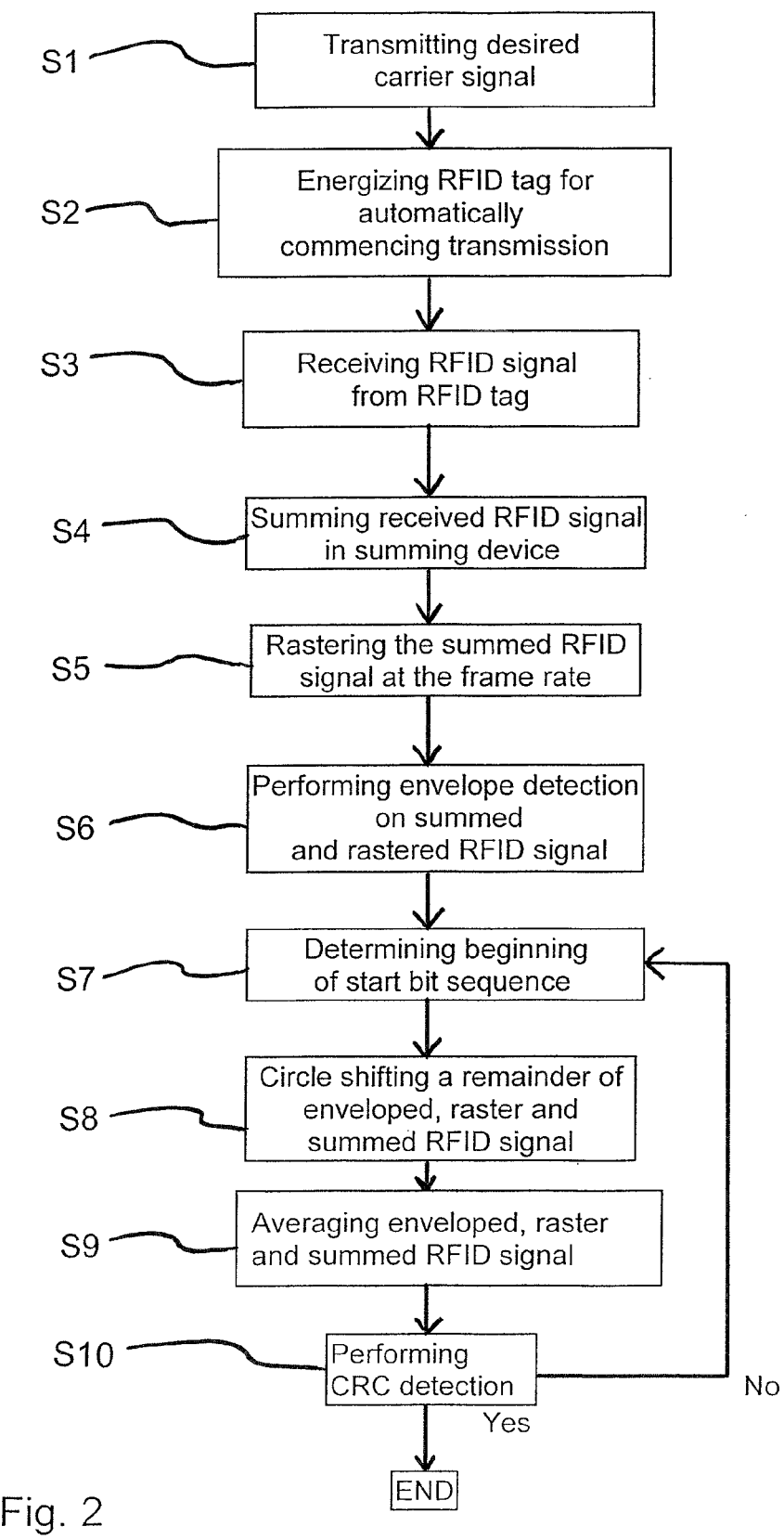
FIG. 2 is a flow diagram showing the steps of the method according to the present invention.
Figure 3A:
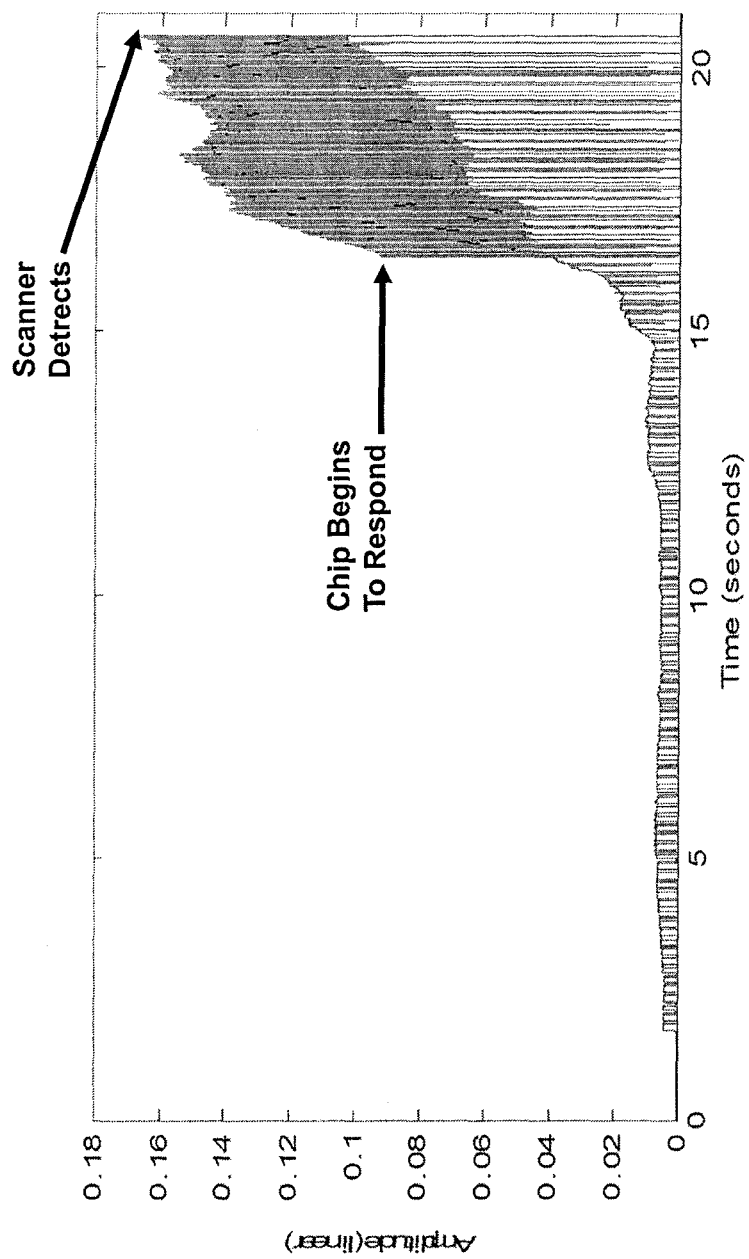
FIG. 3A is an exemplary graph of the start of the interrogation process and eventual initiation of the transmission process by the transponder of the RFID tag.
Figure 3C:
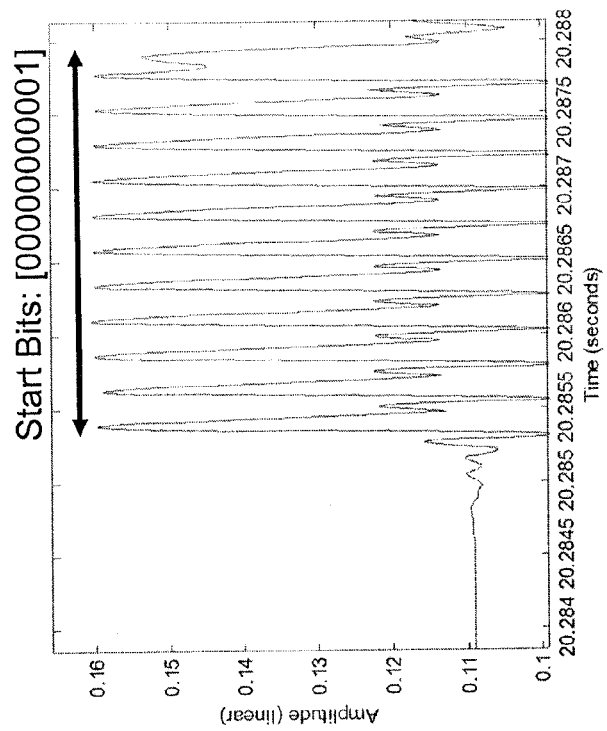
FIG. 3C is a section of the exemplary graph in which a portion of the bits, in FIG. 3B, are enlarged or zoomed for clarification.
Figure 3B:
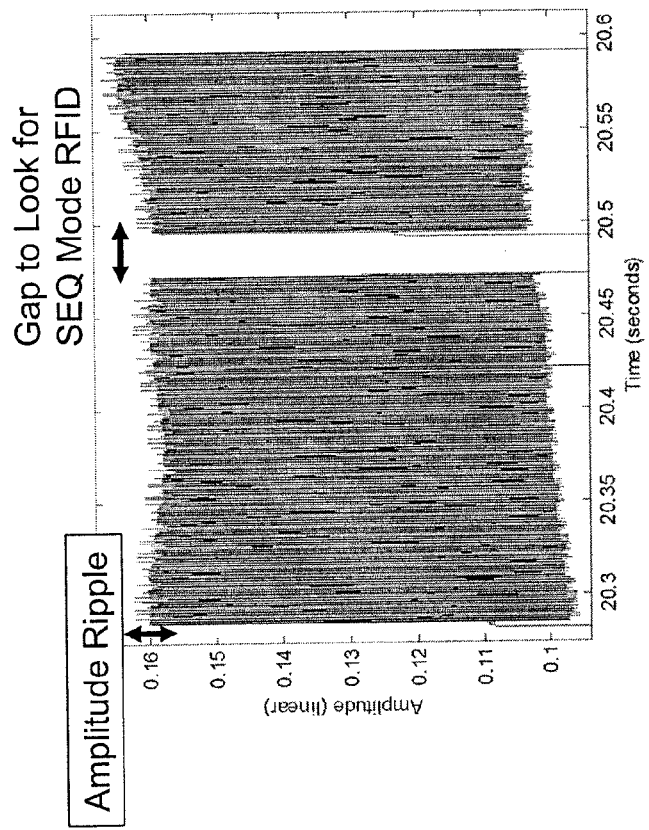
FIG. 3B is an exemplary graph of some data bits collected according to the present invention.
Figures 5A, 5B:
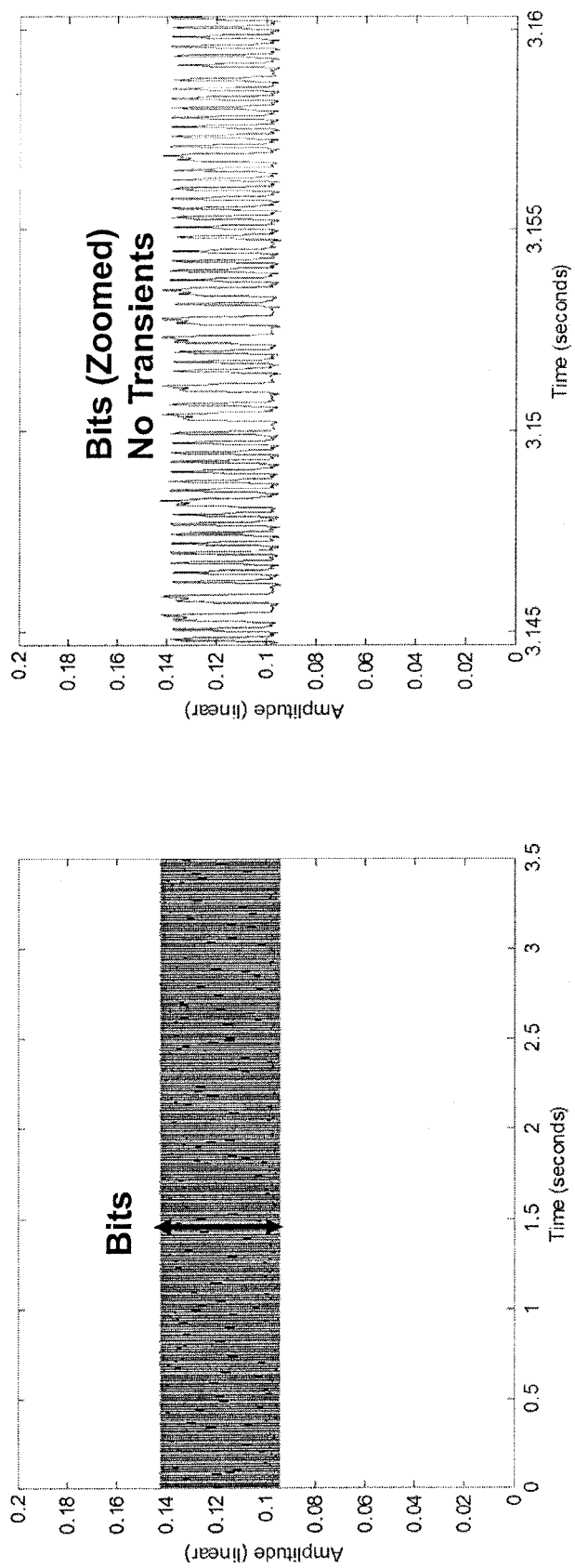
FIG. 5A is another exemplary graph of the data bits collected, according to the present invention, with substantially continuous illumination so that the bits are collected substantially without any transient.
FIG. 5B is a section of the exemplary graph in which a portion of the bits, in FIG. 5A, are enlarged or zoomed for clarification.

As generally shown in FIG. 2, during first step S1, a transmission coil 6 of the RFID scanner, reader or interrogator 2 transmits a desired carrier signal 4, e.g., 134.2 kHz carrier signal, which is directed toward a desired RFID tag 10 to be interrogated in order to excite or energize the associated transponder 8. Assuming that the transponder 8 of the RFID tag 10 is sufficiently excited or energized by the carrier signal 4 sent from the RFID scanner, reader or interrogator 2, during a second step S2, the transponder 8 will then automatically commence transmission of the encoded data field of the RFID tag 10, i.e., the response message, back toward the receiver coil 12 of the RFID scanner, reader or interrogator 2. The response message is typically embedded as part of a reflected and returned RFID carrier signal, e.g., the returned RFID signal is a combination of the response message from the RFID tag 10 plus the reflected and returned carrier signal and possibly extraneous noise.

The receiver uses an Analog to Digital Converter (ADC) which has a minimum 24-bit resolution so that the low level signal generated by the transponder, which is overshadowed by the carrier signal, can be sufficiently captured from a sufficient standoff distance and the signals from multiple scans can be combined to average out any embedded noise while enhancing the received signal.

During a third step S3, the returned RFID signal 14, which incorporates the transmitted encoded data field from the RFID tag 10 being interrogated, is received by the receiver coil 12 of the RFID scanner, reader or interrogator 2 (RFID signal), Once the returned RFID signal is received by the receiver coil 12, the RFID signal then undergoes processing by the processing device 15 of the system, discussed below in further detail.

At fourth step S4, this received RFID signal 14 is then sent to a summing device where the RFID signal 14 is added or "summed" with essentially a negative of the originally transmitted interrogation or carrier signal. That is, the received RFID signal 14, which essentially comprises the encoded data field of the RFID tag 10 being interrogated plus the reflected and returned interrogation or carrier signal, is then added or combined with a phase shifted, amplitude scaled transmitted interrogation or carrier signal, i.e., combined with an interrogation or carrier signal which is typically phase shifted by 180 degrees and suitably amplitude scaled. As a result of this summing process, the originally transmitted and reflected interrogation or carrier signal is substantially removed and/or cancel from the RFID signal 14 thereby essentially only leaving the transmitted encoded data field, from the RFID tag 10, plus some extraneous "noise" (the summed RFID signal 16).

For example, assuming the interrogation or carrier signal is 134.2 kHz signal, the received RFID signal is essentially summed or combined with −134.2 kHz interrogation or carrier signal and the net result, of this summing process, is that the transmitted and reflected interrogation or carrier signal is substantially eliminated, cancelled and/or removed from the RFID signal 14, received from the RFID tag 10, thereby generally leaving the desired response message, i.e., the transmission signal which was generated by excitation of the transponder of the RFID tag 10 which contains the encoded data field of the RFID tag 10 being interrogated.

It is to be appreciated that by reducing the level of the transmitted and received RFID signal, before performing any digitization of the received signal firstly greatly reduces the dynamic range of the A/D converter without significantly degrading the RFID signal which was received by the RFID scanner, reader or interrogator 2. This, in turn, also allows the use of lower performance A/D converters, when converting the summed RFID signal 16 from an analog format into a digital format for further processing by the processing device. Secondly, this also results in increased sensitivity during coherent integration of successive copies of the 128 characters of the bit stream which comprise the encoded data field of the RFID tag 10, as discussed below in further detail, until a valid CRC is eventually obtained by the process and the method according to the present invention.

Next, the summed RFID signal 16 then undergoes further signal processing by a determining device 18 of the system. That is, the summed RFID signal 16 is next rastered at the frame rate, during fifth step S5, to achieve a rastered and summed RFID signal 20.

During a sixth step S6, a conventional envelope detection technique is utilize in order to commence deciphering of the summed and rastered RFID signal 20. During this further process, the method and the system utilize the summed and rastered RFID signal 20, as the input signal, and generates an enveloped output signal, e.g., enveloped, rastered and summed RFID signal 22, which is an "envelope" of the original rastered and summed RFID signal 20.

Next, during a seven step S7, the system and the method will then evaluate the enveloped, rastered and summed RFID signal 22 typically attempting to determine the beginning of the start bit sequence of the encoded data field. That is, the system and the method each then evaluate the enveloped, rastered and summed RFID signal 22 in an attempt to locate a beginning of the start bit sequence which signifies the beginning of the transmission of the encoded data field. More specifically, the system and the method will examine and search the complied encoded data field looking for the start bit sequence of the RFID tag transmission, e.g., the system and the method attempt to identify the location of the enveloped, raster and summed RFID signal 20 which more closely approximates the start bit sequence of the encoded data field transmission from the RFID tag transmission.

A Viterbi decoder is used to take advantage of the fact that a valid '1' bit always inverts the polarity of subsequent bits to help in the vs. '0' bit decisions. This look-ahead scheme allows for the correction of individual bits that get overcome by noise.

Once the system and the method identify the start bit sequence of the RFID tag transmission, e.g., in this instance, the "00000000001" which signifies the start bit sequence, a remainder of the detected, enveloped, raster and summed RFID signal 24 is then "circle shifted," in a conventional manner, during an eighth step 38, so as to complete formation of first scan or interrogation of the encoded data field 26. At step S9, the available enveloped, raster and summed RFID signals, concerning the encoded data field 26, are averaged with one another to form a smoother signal of the encoded data field 26. Finally, a CRC detection is then preformed, at step S10, to determine whether or not the encoded data field can be accurately read based upon the current scan of the RFID tag 10 being interrogated. If the CRC detection, preformed at step S10, can accurately determine the encoded data field of the RFID tag 10 being interrogated, the system and method end at step S11.

Assuming that the encoded data field can not be accurately read based upon the current scan(s) of the RFID tag 10 being interrogated, then the above process is again repeated. That is, the system and the method will again search an next sequential section of the complied encoded data field again looking for the start bit sequence of the RFID tag transmission, e.g., identify the location of the remaining enveloped, raster and summed RFID signal 20 which more closely approximates the start bit sequence of the encoded data field of the RFID tag transmission, e.g., in this instance, the "000000000001". Once the system and the method again identify the start bit sequence of the encoded data field of the RFID tag transmission, the remainder of the enveloped, raster and summed RFID signal 20 is then circle shifted so as to complete the encoded data field and form a first frame-to-frame integration of the transmitted encoded data field of the RFID tag being interrogated.

As noted above, each conventional RFID tag 10, at the beginning of the transmission sequence, transmits the start bit sequence which is then followed by the remainder of the encoded data field concerning that specific RFID tag 10 being interrogated. Since the RFID scanner, reader or interrogator 2 continuously interrogates the RFID tag 10, i.e., normally continuously sends an interrogation carrier signal to the internal circuitry or transponder 8 of the RFID tag 10, as soon as transmission of the data field information, by the internal circuitry or transponder 8 of the RFID tag 10, is completed, the internal circuitry or transponder 8 of the RFID tag 10 is normally re-energized and again transmits the RFID signal back to the receiver coil 12 of the RFID scanner, reader or interrogator 2. This process is continuously repeated until the RFID scanner, reader or interrogator 2 eventually accurately reads the RFID tag 10, i.e., the CRC is eventually detected at step 9, and the read results are then displayed, at step 10. Thereafter, the RFID scanner, reader or interrogator 2 discontinues transmission of the carrier signal 4 toward the RFID tag 10 to energize the internal circuitry or transponder 8 thereof.

FIG. 6A diagrammatically shows the partial results of a first frame-to-frame integration of the received encoded data field, from the RFID tag 10 being interrogated, following completion of the envelope detection, detection of the start bit sequence and circle shifting steps discussed above. FIG. 6B diagrammatically shows an average of 4 aligned frame-to-frame integrations of the received encoded data field of the RFID tag 10 being interrogated, while FIG. 6C diagrammatically shows an average of 8 aligned frame-to-frame integrations of the received encoded data field of the RFID tag 10 being interrogated. FIG. 6D diagrammatically shows an average of 12 aligned frame-to-frame integrations of the received encoded data field of the RFID tag 10 being interrogated, while FIG. 6E diagrammatically shows an average of 16 aligned frame-to-frame integrations of the received encoded data field of the RFID tag 10 being interrogated. As can generally be seen from FIG. 6E, the resulting averaged curve of 16 frame-to-frame integrations is relatively smooth so that the system and the method can more easier distinguish the zero ("0") bits from the one ("1") bits, e.g., the binary code 00000000001 can be readily determined from FIG. 6E. It is to be appreciated that frame-to-frame integrations may, if desired or required, be conducted on all 128 characters of the bit stream or may be conduced on any desired portion or selected segment thereof in addition to the start bit sequence. This frame-to-frame integration technique for additional characters, in addition to the start bit sequence, may be utilized when looking for a specific tag or a set of tags, e.g., attempting to identify a specific pet which should be provided access through a pet door which is discussed below in further detail.

In the event that the average of the first 16 interrogations of the RFID tag 10 does not result in a sufficiently smooth curve so as to permit deciphering or determination of all of the zeros ("0"), of the binary code, from all of the ones ("1"), of the binary code, from one another, as generally shown in FIG. 6E, then an additional interrogation of the internal circuitry or transponder 8 of the RFID tag 10 occurs and the oldest encoded data field—in this instance the information obtained during the first scan or interrogation of the encoded data field transmitted by the transponder 8 of the RFID tag 10—is discarded and the remaining 15 more recent scans or interrogations (i.e., scans or interrogations 2-16) of the encoded data field are then averaged with this newly acquired most recent scan or interrogation (i.e., scan or interrogation 17) of the encoded data field of the RFID tag 10 being interrogated.

The system and the method will then evaluate this average of the encoded date field, i.e., the average of 16 most recent frame-to-frame integrations, to determine whether or not the system and the method can reliably determine the start bit sequence of the encoded data field as well as all of the remaining characters of the encoded data field. In the event that the start bit sequence and the remainder of the encoded data field of the RFID tag 10 can be accurately read, then the system and the method reads the encoded data field of the RFID tag 10, displays or transmits the results, and the subsequently terminates further scanning or reading of the RFID tag 10 to be interrogated.

Otherwise, in the event that either the start bit sequence and/or a remainder of the stored encoded data field of the RFID tag 10 to be interrogated still can not be accurately read by the RFID scanner, reader or interrogator 2, then the system and the method will again repeat the above process by conducting a still further scan or interrogation of the internal circuitry or transponder 8 of the RFID tag 10 to be interrogated (i.e., scan or interrogation 18) and discard the next oldest encoded data field—in this instance the second scan or interrogation of the encoded data field—while the 15 more recent scans or interrogations (e.g., scans or interrogations 3-17) of the encoded data field are retained and then averaged with this most recent scan or interrogation (i.e., scan or interrogation 18) of the encoded data field.

The RFID transponder is a polarized device and responds better to magnetic fields aligned with the length of the device. For this reason, a rotating polarity is used in the transceiver to locate the orientation of the transponder device. Once the best orientation is found, while looking for the start bits, then that orientation is maintained, while the raster and summing operations are performed.

This process is repeatedly repeated until both the starting bit sequence and a remainder of the stored encoded data field of the RFID tag 10 to be interrogated can be identified and accurately read. Once accurate reading of the entire encoded date field is achieved by the system and the method, the results are then displayed and both the method and the process end and thus discontinue further operation.

In addition to the baud detection, the detection of the sync bits is used to further enhance the "warmer-colder" signal to indicate when the detector is getting close enough to be able to correctly decode the data.

While the above description makes reference to averaging 16 scans or interrogations with one another, it is to be appreciated that either more than 16 scans or interrogations or less than 16 scans or interrogations may be average with one another, depending upon the particular application, without departing from the spirit and scope of the present invention.

The RFID scanner, reader or interrogator 2 is provided with an RFID tag detection proximity indicator 30, e.g., a "warmer-colder" proximity indicator, which evaluates an amplitude of the baud rate line which forms the basis for a signal strength measurement. The RFID tag detection proximity indicator 30 normally evaluates the signal strength of the return RFID signal 14, from the RFID tag 10, so that when the RFID scanner, reader or interrogator 2 is moving in a direction toward the RFID tag 10 to be interrogated, the RFID tag detection proximity indicator 30 will generally detect an increase in the amplitude of the baud rate line which signifies that the RFID scanner, reader or interrogator 2 is moving closer to the RFID tag 10. On the other hand, when the RFID scanner, reader or interrogator 2 is moving in a direction away from RFID tag 10 to be interrogated, the RFID tag detection proximity indicator will generally detect a decrease in the amplitude of the baud rate line which signifies that the RFID scanner, reader or interrogator 2 is moving further away from the RFID tag 10. This feature is possible because of the presence of a baud rate spectral line with data bits that transition synchronously with the scanner signal can be detected well before a correct CRC is eventually obtained by the method and the system according to the present invention.

It is to be appreciated that the RFID tag detection proximity indicator 30 can generate or emit a variety of different types of audio, visual, vibrational, etc., outputs or signals which are directly indicative of the detected amplitude of the baud rate line and thereby provide the operator of the RFID scanner, reader or interrogator 2 with an accurate "warmer" or "colder" proximity indication that assists the operator with accurate placement of the RFID scanner, reader or interrogator 2, within its read range of the RFID tag 10 to be interrogated so that the RFID tag 10 to be interrogated can be accurately read in a rapid and efficient manner.

One application for the present invention is to incorporate the RFID scanner, reader or interrogator 2 as a reader/scanner which is to be used in conjunction with a pet door assembly 32 that provides access, e.g., a means of ingress and/or egress, for a pet or animal with respect to a house, a garage, a basement or some other facility. As is conventional in the art, the pet door 34 is usually hingedly connected 36, only diagrammatically shown, to a top portion of the frame 36, or possibly a side portion of the frame, while the frame is bolted or otherwise permanently secured about a perimeter of an opening which is formed in a door, a wall or some other support structure 40 of the house, the garage, the basement or other facility, so as to block access through the open. The pivotable door is normally maintained in a generally "closed position" which blocks access through the opening. When the pivotable door is biased, for example, by a paw, a nose, a head or some other extremity of a pet or an animal, the pet door 34 can be pivoted into the opened position which provides access, for the pet or the animal, through the opening. Once the pet or the animal passes through the opening and is sufficiently clear thereof, the pivotal pet door 34 automatically rotates or pivots back into its normally closed position.

One problem associated with lockable pet doors is that while they may provide access for a desired pet or other animal, such pet doors also potentially provide access for unwanted guests, such as a neighbor's pet or animal, a wild animal, a rodent, etc. While it is possible to manually lock the pet door, by a conventional manual latching/locking mechanism, during the night and/or at other times when access through the pet door is to be prevented, it is often difficult for one of the occupants of the house or other facility to consistently remember to both latch or unlatch the pet door 34 at the required times.

Automated systems for latching/unlatching a pet door also known. One such automated system generally requires a power source for the system as well as an RFID tag to be carried by each pet that is authorized have access through the pet door assembly 32. Once the automated system verifies that the pet or animal should be provided access through the opening, the automated system unlatches the latching mechanism and provides access. However, one of the major problems associated with such prior art automated systems is that it is difficult for the currently known RFID scanners, readers or interrogators to accurately read the RFID tag(s) within an acceptable time period, e.g., before the pet or other animal, which should be provided with access through the opening of the pet door assembly 32, becomes distracted and/or otherwise moves away from the pet door.

Figure 7:
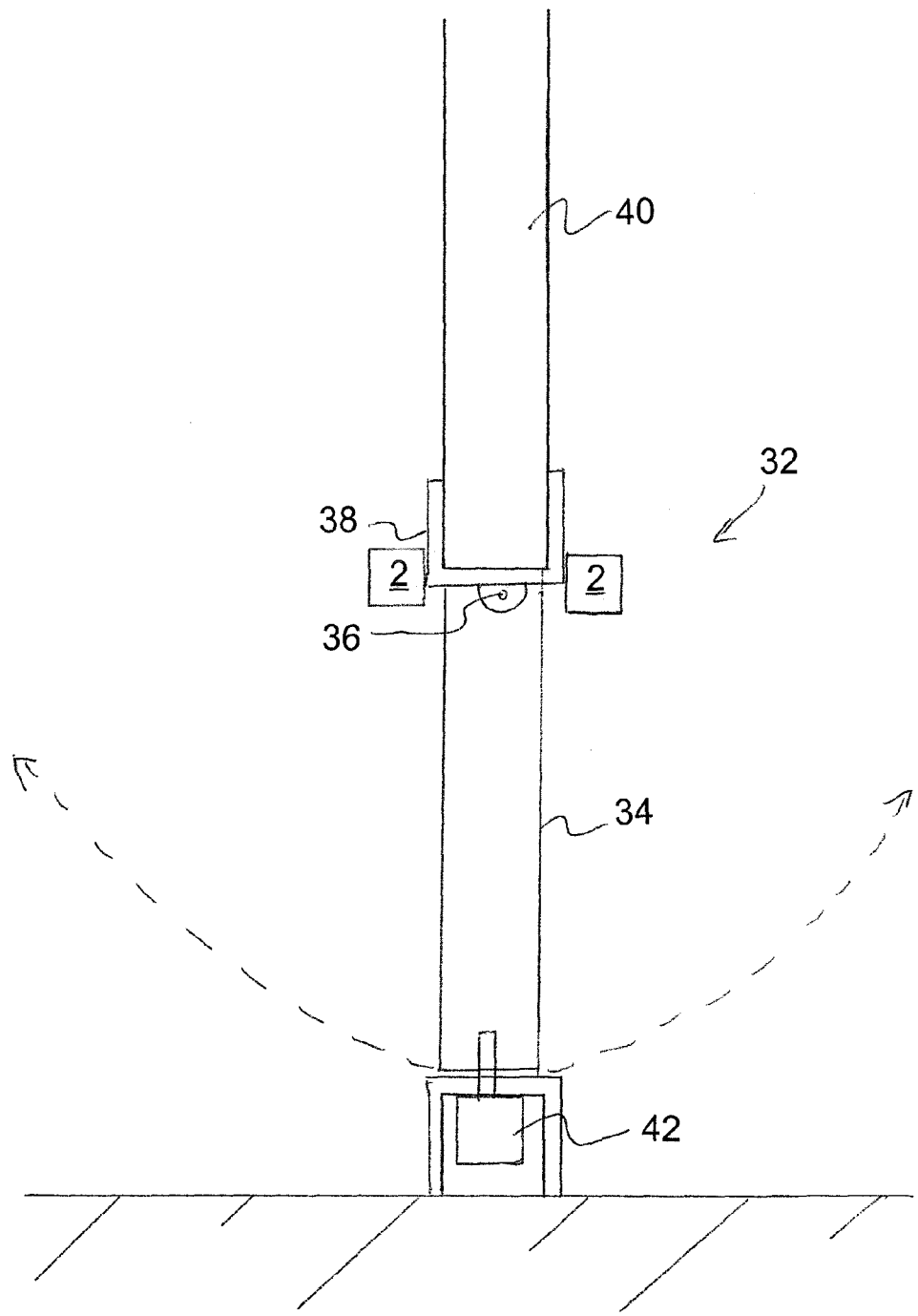
FIG. 7 is a top plan diagrammatic view showing one implementation of the improved RFID scanner, reader or interrogator of the present invention.

Due to the increased read range of the RFID scanner, reader or interrogator 2 as well as the increased sensitivity and shorter read time, the RFID scanner, reader or interrogator 2, according to the presently claimed invention, is particularly adapted and suitable for use with any conventional automated system incorporating an electronically or electrically actuated latching/unlatching mechanism for a pet door. As generally shown in FIG. 7, the pet door assembly 32 is pivotally connected to a frame 38 which normally blocks the access opening. The pet door 34 has both an opened position, in which access through the access opening is provided, and a closed position, in which access through the access opening is blocked or prevented. At least one and possibly a pair RFID scanners, readers or interrogators 2—one located adjacent the inwardly facing side of the pet door 32 and a second located adjacent an outwardly facing side of the pet door 34—assuming that the pet door 34 is to pivot both inwardly and outwardly so as to allow the authorized pet or other animal to both enter and leave the building or facility. Each one of the RFID scanners, readers or interrogators 2 is electrically coupled to the locking/unlocking mechanism 42 by conventional wiring (not shown). When a pet or other animal, carrying a preprogrammed RFID tag 10 which should be provided access through the opening, is located within the effective read range, e.g., 16 to 24 inches for example, of one of the RFID scanners, readers or interrogators 2 for a sufficient duration of time, e.g., 2-20 seconds or so, one of the RFID scanners, readers or interrogators 2 is generally able to read and authenticate such preprogrammed RFID tag and then send an unlatching signal to the latching/unlatching mechanism 42 of the automated system. Typically the unlatching mechanism 42, upon receiving and unlatching signal, is actuated for a brief period of time, e.g., entry time, a few seconds to a couple of minutes, so as to provide ample time for the authorized pet or animal to pass through the access opening, normally blocked by the temporarily unlocked pet door 34. After expiration of such entry time—assuming that the authorized pet is no longer within the read range of one of the RFID scanners, readers or interrogators 2—the latching mechanism 42 is automatically actuated by the automated system, in a conventional manner, to re-lock the pet door 34 and thereafter prohibit unauthorized passage therethough.

Figure 8:
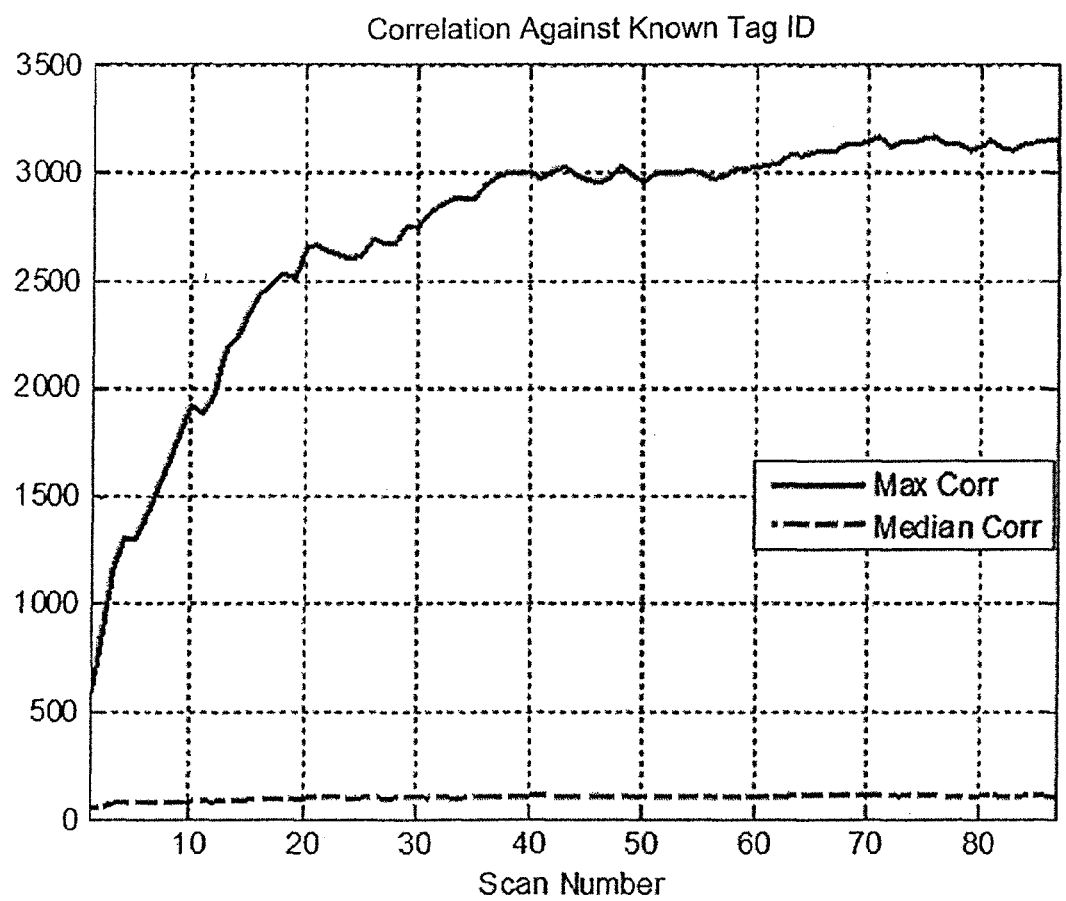
FIG. 8 is a diagrammatic figure showing a correlation between a received signal against the computed waveform for the desired RFID tag.

With respect to the above discussed pet door application or anytime one is looking for the presence of a specific tag ID, it is also possible to correlate the received RFID signal 14 against a computed waveform for the desired tag, as generally shown in FIG. 8. This provides much greater sensitivity and read range than continually integrating until the CRC is eventually passed. This is generally due to a couple of factors. First, the CRC check requires that the received raw bits have been properly rotated and orientated to commence with the 11 start bit sequence. This is typically necessary because the raster and accumulate technique may start at a random point in the bit sequence. Establishment of the proper rotation is normally done by correlating against the known start bit sequence. However, this is prone to errors since this sequence is only 11 bits in length so little processing gain from accumulation can be had. However, by correlating against the entire 128 bits of a known tag ID provides an additional 10 dB of processing gain. Also, by performing a circular correlation, the unknown location of the start bit sequence has no effect on the correlation score.

As generally shown in FIG. 8, the peak and the median correlation scores, as a function of the number of accumulated scans or interrogations, are diagrammatically shown. It is to be noted the peak rises rapidly compared to the median (e.g., a reference threshold). In this example, it eventually took a total 87 scans or interrogations before the CRC was eventually passed, but the correlation plot of FIG. 8 shows successful recognition after only a few scans or interrogations of the RFID tag 10 to be interrogated.

It is to be appreciated that an another important aspect the present invention is that it provides for adaptive cancellation so that the system and the method can readily account for aging or deterioration of any of the components of the system and method.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

Preferably the memory is 4096 which is suitable for handling 128 characters which are switched in and out of the circuit at a rate equal to the scanner's frequency (134.2 kHz) divided by 32, e.g., 128 characters multiplied by 32.

Wherefore, we claim:

1. A system comprising an RFID scanner, a reader or an interrogator for interrogating a transponder of a desired RFID tag to be interrogated, the system comprising:
    a transmitting and receiving devices for transmitting a desired carrier signal toward the RFID tag to be interrogated and receiving an RFID signal from the RFID tag to be interrogated; and
    a processing device for processing the RFID signal, received from the RFID tag to be interrogated, and averaging encoded data fields of at least two scans with one another and facilitate reading the encoded data field of the RFID tag to be interrogated.

2. The system according to claim 1, wherein the processing device removes the carrier signal from the RFID signal to thereby leave the encoded data field of the RFID tag to be interrogated.

3. The system according to claim 2, wherein a summing device sums the received RFID signal from the RFID tag to be interrogated with a phase shifted, amplitude scaled transmitted carrier signal to remove the carrier signal from the RFID signal.

4. The system according to claim 3, wherein the summing device sums the received RFID signal from the RFID tag to be interrogated with an amplitude scaled transmitted carrier signal which is phase shifted 180 degrees.

5. The system according to claim 1, wherein the system includes proximity indicator for indicating a proximity of the RFID tag to the RFID scanner, reader or interrogator during use of the system.

6. The system according to claim 5, wherein the proximity indicator evaluates an amplitude of a baud rate line, which forms a basis for a signal strength measurement, so that as the RFID scanner, reader or interrogator moves closer toward the RFID tag to be interrogated, the proximity indicator generates a signal which signifies that the RFID scanner, reader or interrogator is moving closer to the RFID tag, and as the RFID scanner, reader or interrogator moves away from the RFID tag to be interrogated, the proximity indicator generates a signal which signifies that the RFID scanner, reader or interrogator is moving further away from the RFID tag to be interrogated.

7. The system according to claim 5, wherein proximity indicator emits one of an audio, a visual and a vibrational signal, to an operator of the system, which indicates a proximity of the RFID scanner, reader or interrogator with respect to the RFID tag to be interrogated to assist the operator with placement of the RFID scanner, reader or interrogator within a read range of the RFID tag to be interrogated.

8. The system according to claim 1, wherein the carrier signal comprises a carrier signal having a frequency which ranges between 9 kHz and 3000 GHz.

9. The system according to claim 8, wherein the carrier signal comprises a 134.2 kHz carrier signal.

10. The system according to claim 1, wherein the transmission device is supplied with a sufficient voltage and current so as to transmit a sufficiently stronger carrier signal to the RFID tag to be interrogated so as to facilitate exciting the RFID tag to be interrogated from a distance of at least 15 and thereby increase a read range of the RFID scanner, reader or interrogator.

11. The system according to claim 1, wherein the transmission device is spaced from the receiver device by a greater distance than both:
   a spacing of the transmission device from the RFID tag to be interrogated, during interrogation, and
   a spacing of the receiving device from the RFID tag to be interrogated, during interrogation.

12. The system according to claim 1, wherein the system is used in combination with automated latching/unlatching pet door assembly, the pet door assembly comprises frame pivotally supporting a pet door which normally blocks an access opening, at least one RFID scanner, reader or interrogator is electrically coupled to an locking/unlocking mechanism for the pet door, when an authorized animal, carrying a preprogrammed RFID tag which should be provided access through the pet door, is located within an effective read range of the RFID scanner, reader or interrogator for a sufficient duration of time to facilitate authentication of such preprogrammed RFID tag, an unlatching signal is transmitted to the latching/unlatching mechanism to provide time for the authorized animal to pass through the access opening.

13. A system comprising an RFID scanner, a reader or an interrogator for interrogating a transponder of a desired RFID tag to be interrogated;
   a transmission device for transmitting a desired carrier signal toward the RFID tag to be interrogated;
   a receiving device for receiving an RFID signal from the RFID tag to be interrogated;
   a summing device for summing the RFID signal from the RFID tag to be interrogated with the carrier signal for substantially removing the carrier signal from the RFID signal and thereby leaving an encoded data field of the RFID tag to be interrogated;
   a processing device for processing the encoded data field and determining a start bit sequence of the encoded data field for at least one scan; and
   an averaging device for averaging the encoded data fields of at least two scans with one another and facilitate reading the encoded data field of the RFID tag to be interrogated.

* * * * *